(12) United States Patent
Baylis et al.

(10) Patent No.: US 7,921,905 B2
(45) Date of Patent: Apr. 12, 2011

(54) PLASTIC INTERCOOLER

(75) Inventors: Bobbye Kaye Baylis, Harrow (CA); Bruce J. Harvey, Shelby Township, MI (US); Ian R. McLean, Chatham (CA); Paul D. Daly, Troy, MI (US)

(73) Assignee: Mahle International GmbH, Stuttgart (DE)

( * ) Notice: Subject to any disclaimer, the term of this patent is extended or adjusted under 35 U.S.C. 154(b) by 1322 days.

(21) Appl. No.: 11/478,022

(22) Filed: Jun. 29, 2006

(65) Prior Publication Data
US 2008/0000625 A1    Jan. 3, 2008

(51) Int. Cl.
F28F 1/10 (2006.01)
F28F 9/02 (2006.01)

(52) U.S. Cl. ........................ 165/172; 165/173

(58) Field of Classification Search .................. 165/146, 165/172, 175, 176, 173
See application file for complete search history.

(56) References Cited

U.S. PATENT DOCUMENTS

| | | | |
|---|---|---|---|
| 3,769,117 A * | 10/1973 | Bowen et al. | 156/69 |
| 3,935,358 A | 1/1976 | Wyeth et al. | |
| 4,411,310 A | 10/1983 | Perry et al. | |
| 4,632,182 A * | 12/1986 | Hagemeister | 165/173 |
| 4,859,265 A | 8/1989 | Shuster et al. | |
| 4,871,017 A | 10/1989 | Cesaroni | |
| 4,919,199 A * | 4/1990 | Hahn | 165/162 |
| 5,039,370 A | 8/1991 | Cesaroni | |
| 5,114,776 A | 5/1992 | Cesaroni | |
| 5,195,240 A | 3/1993 | Shuster et al. | |
| 5,469,915 A | 11/1995 | Cesaroni | |
| 6,094,816 A * | 8/2000 | Doshi | 29/890.043 |
| 6,302,197 B1 * | 10/2001 | Hornby et al. | 165/173 |
| 6,554,929 B2 * | 4/2003 | Lee | 156/73.1 |
| 7,244,482 B2 * | 7/2007 | Bager et al. | 428/35.2 |
| 2003/0029040 A1 | 2/2003 | Cesaroni | |
| 2005/0247442 A1 | 11/2005 | Daly | |
| 2007/0131401 A1 | 6/2007 | Daly et al. | |

FOREIGN PATENT DOCUMENTS

WO    2007065271    6/2007

OTHER PUBLICATIONS

International Search Report and Written Opinion mailed on Apr. 29, 2008.
Partial Search Report PCT/US2007/072435.
Top Technologies for 1998, Thermoplastic Heat Exchanger, Automotive Engineering International, Dec. 1998.
http://www.cesaroni.net, Various Excerpts from Website.
International Preliminary Report on Patentability dated Jan. 15, 2009.

* cited by examiner

*Primary Examiner* — Tho v Duong
(74) *Attorney, Agent, or Firm* — Carlson, Gaskey & Olds, P.C.

(57) ABSTRACT

A plastic intercooler assembly includes a plurality of plastic tubes that extend between plastic end plates. The plastic tubes are secured to the end plates to provide the desired seal between the end plates and the ends of the tubes. The plastic tubes are attached utilizing plastic welding methods that reduce assembly time and cost.

3 Claims, 6 Drawing Sheets

PLASTIC INTERCOOLER

BACKGROUND OF THE INVENTION

This invention generally relates to an intercooler for use in a motor vehicle. More particularly, this invention relates to a plastic intercooler and method of fabricating and assembling a plastic intercooler.

An intercooler is a heat exchanger for transferring heat from one fluid into another fluid that is not physically in contact. One example application of an intercooler is for cooling turbo compressor exhaust gases prior to use in a turbocharger or as charge air. It is desired to cool the exhaust gases to reduce volume and increase the amount of charge air that can be input into the cylinder. The hot air is directed through a plurality of tubes over which cooling air flows. Heat from the hot air is transferred through the tubes and carried away by the cooler air.

A conventional intercooler includes a plurality of tubes that span between manifolds or tanks on each end. The tanks typically comprise an open internal volume in communication with an open end of the plurality of tubes. The tanks include an inlet to provide for a single inlet or outlet for air flow through the intercooler. The tubes are typically formed from metals such as aluminum, copper or brass that are welded or brazed to end plates. The end plates are in turn attached to the tanks to provide the desired inlet and outlet for the intercooler.

Disadvantageously, metal tube construction and fabrication provide a relatively heavy and cumbersome device. Further, the use of metal tubes limits the configuration of the intercooler. The constraints on devices installed within vehicles are becoming more demanding as related to cost, weight and flexibility of design.

Accordingly, it is desirable to design and develop improved methods and materials for fabricating and assembling an intercooler device.

SUMMARY OF THE INVENTION

A plastic intercooler assembly includes a plurality of plastic tubes that extend between plastic end plates. The plastic tubes are secured to the end plates to provide the desired seal between the end plates and the ends of the tubes.

The plastic tubes are attached utilizing plastic welding methods that reduce assembly time and cost. An example intercooler assembly includes an outer perimeter with the inlet and outlet disposed within the outer perimeter. The plurality of tubes includes tubes of differing lengths to accommodate the shape of the tanks and the inlet and outlet. The different length of tubes accommodates a curved profile of the first and second end plates that in turn provides for the efficient use of space within the outer perimeter of the intercooler assembly.

Another example intercooler assembly includes a first group of tubes that have a stable operation temperature that is lower than the operating temperature of a second group of tubes. As the first group of tubes and the second group of tubes operate at different temperatures, different materials are utilized to perform efficiently at the different temperatures thereby accommodating the thermal gradient across the intercooler assembly.

Another example intercooler includes a manifold from which generally U-shaped tubes extend that are attached to the manifold at both ends. The U-shaped tubes eliminate a significant amount of joints to simplify assembly and fabrication of the intercooler assembly.

These and other features of the present invention can be best understood from the following specification and drawings, the following of which is a brief description.

DETAILED DESCRIPTION OF THE PREFERRED EMBODIMENT

Figure 1:
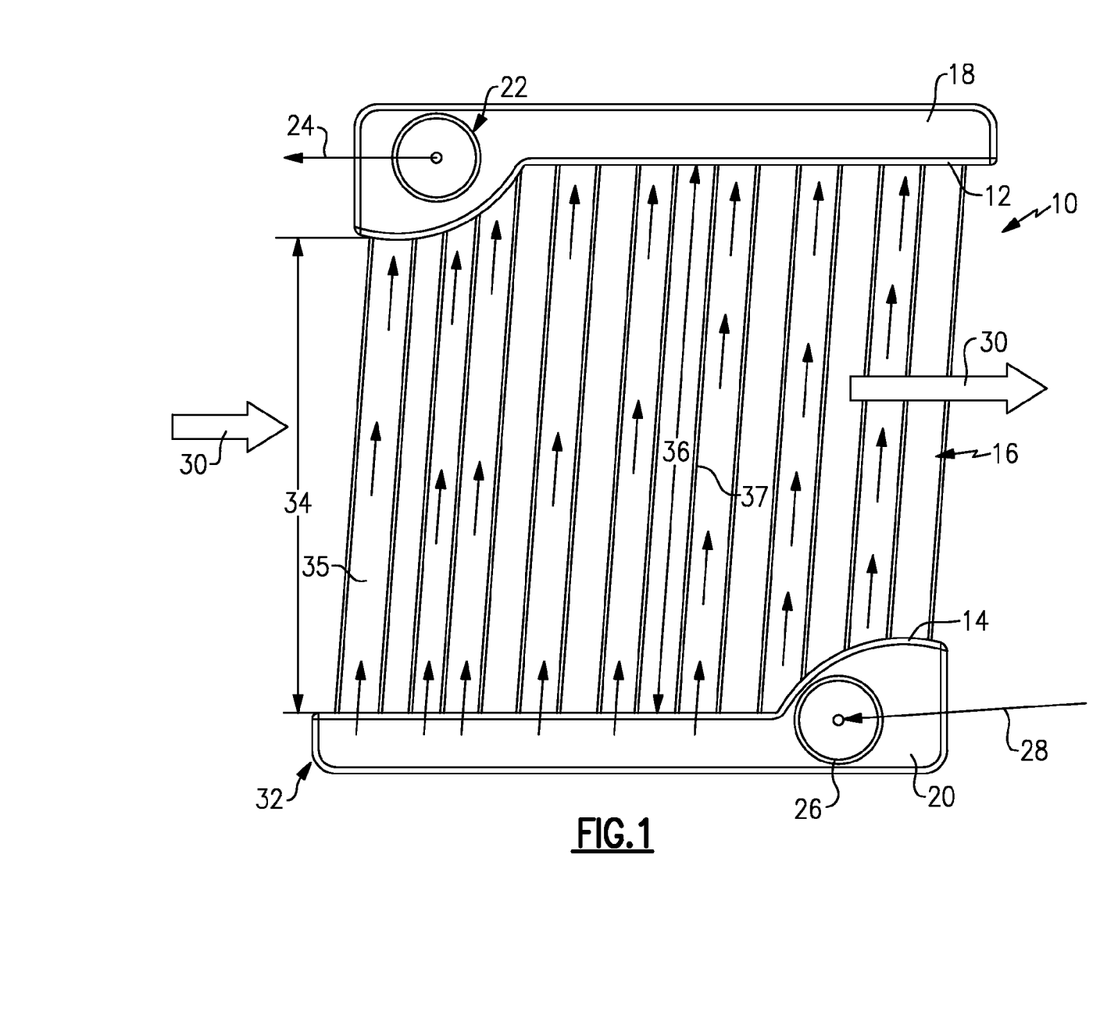
FIG. 1 is an example plastic intercooler assembly.

Referring to FIG. 1, an intercooler assembly 10 includes a first end plate 12 and a second end plate 14. Extending between the first end plate 12 and the second end plate are a plurality of plastic tubes 16. A first tank 18 is attached to the first end plate 12 and a second tank 20 is attached to the second end plate 14. The first tank 18 includes an opening 22 providing an outlet for exhausting air indicated by arrows 24. The second tank includes an inlet 26 for incoming air indicated by arrow 28.

The incoming air 28 is at a high temperature and enters the inlet 26 that is in communication with the plurality of tubes 16. The high temperature air flows through the plurality of tubes 16 to the first tank 18. As the air flows through the plurality of tubes 16, a portion of the heat is rejected through the plurality of tubes 16 to a cooling stream 30 that flows across and around each of the plurality of tubes 16. The exhaust air 24 exiting the outlet 22 is therefore at a lower temperature than the air entering the inlet 26.

The intercooler assembly 10 includes an outer perimeter 32. Conventional intercoolers include inlet and outlet housings that extend from the outer perimeter 32. The example intercooler assembly 10 includes the inlet 26 and outlet 24 that are disposed within the outer perimeter 32. The plurality of tubes 16 includes tubes of differing lengths to accommodate the shape of the tanks 18, 20 and the inlet 26 and outlet 24. The plurality of tubes 16 include a first tube 35 including a first length 34 and a second tube 37 having a second length 36 that is greater than the first length. The different length of tubes accommodates the curved profile of the first and second end plates 12, 14. The curved profile of the end plates 12, 14 provide for the efficient use of space within the outer perimeter 32 of the intercooler assembly 10.

Figure 1A:
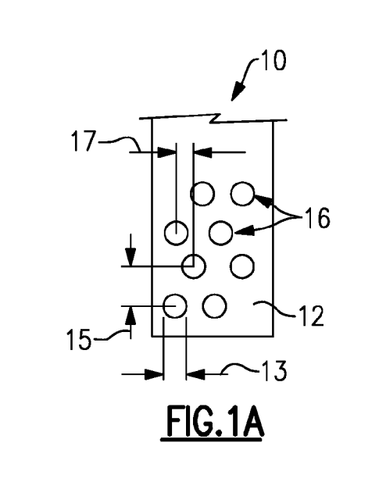

Referring to FIG. 1A, the plurality of tubes 16 are spaced apart approximately 1.5 times a diameter 13 of the tube 16 in both the vertical and horizontal directions 15, 17 to provide a desired airflow path through the intercooler assembly.

Figure 2:
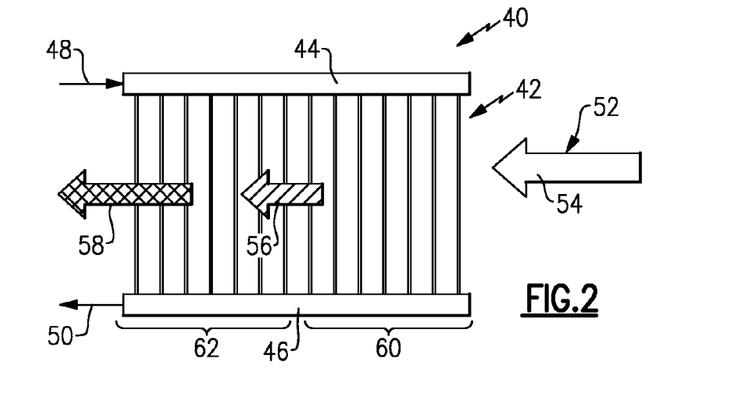
FIG. 2 is another example plastic intercooler including plastic tubes fabricated of different materials.

Referring to FIG. 2, another example intercooler assembly 40 is schematically shown and includes a plurality of plastic tubes 42 extending between a first end tank 44 and a second tank 46. Hot air 48 enters the first tank 44, proceeds through the tubes to the second tank 46 and out as cooler air 50. Heat is rejected into the cooling air stream 52.

The cooling air stream 52 begins at a coolest temperature illustrated at arrow 54 prior to entering into the intercooler assembly 40. As the cooling air stream flows through the intercooler assembly 40 and accepts heat radiated from the plurality of tubes 42, it becomes warmer. Accordingly, the arrow 56 represents cooling airflow 52 at a temperature greater than the temperature of the cooling airflow prior to entering the intercooler assembly 40. Finally, the air exiting the intercooler is at a warmest temperature 58.

The plurality of tubes 42 are therefore exposed to different temperature cooling airflow that affect the thermal efficiency of cooling air within the intercooler. Further, the tubes 42 that receive the cooling airflow 52 first are cooled to a lowest temperature, with the temperature of each of the tubes gradually becoming warmer the further away from that first tube. The material that is utilized in fabricating the plastic tubes 42 is selected according to the thermal gradient experienced during operation. Further, the material for the plastic tubes 42 is selected to accommodate the stable temperature at which the plurality of tubes 42 will operate. In the example intercooler assembly 40 a first group of tubes 60 have a stable operation temperature that is lower than the operating temperature of as second group of tubes 62. As the first group of tubes 60 and the second group of tubes 62 operate at different temperatures, different materials will perform efficiently at the different temperatures.

Plastic material utilized for producing the plastic tubes 42 are provided at different grades that relate to material properties and operating temperatures. For example, plastic material that must operate in an environment of higher temperatures is different than material that operates at lower temperatures. As appreciated, in many instances, the material that is to operate at the higher temperatures is more expensive that the material that is to operate at lower temperatures. In the example intercooler assembly 40 the first group of tubes 60 is fabricated from a first material and the second group of tubes 62 are fabricated from a second material different than the first material. The first material is provided for operation at a lower temperature than the second material. This provides for the efficient use of materials that accounts for the thermal gradient across the intercooler assembly 40.

Figure 3:
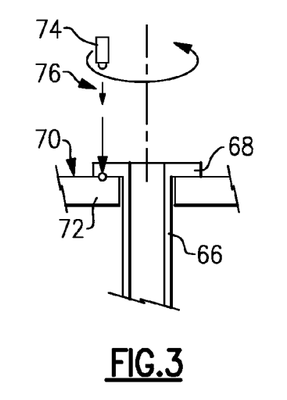
FIG. 3 is a schematic view of an example laser welding method.

Referring to FIG. 3, each of the plurality of tubes is attached at each end to a corresponding end plate. The attachment between each tube and the end plate requires a seal to prevent leakage of air during operation at the temperatures and pressure encountered by the intercooler assembly. In one example, a tube 66 includes a flange 68 that is butted against a surface 70 of an end plate 72. A laser device 74 directs laser energy 76 through the flange 68 and into the end plate 72. In this example, the flange 68 is fabricated from a laser transparent material, and the end plate 72 is fabricated from a laser absorbent material. Further, the relative positions of the flange 68 and the plate 72 can be transposed with the properties of absorbency and transparency so that the flange 68 is attached below the end plate 72.

A portion of laser energy is transmitted through the laser transparent flange 68 and is absorbed by the laser absorbent end plate 72. Absorption of the laser energy by the end plate cause a localized melting of plastic material that in turn causes additional heating of the laser transparent flange 68. Melted material from both the end plate 72 and the flange 68 intermingle and cool, generating the desired weld and seal between the tube 66 and end plate 72. The laser 74 or the tube 66 and end plate 72 are rotated to provide a circumferential weld of the flange 66 to the end plate 72.

Figure 4:
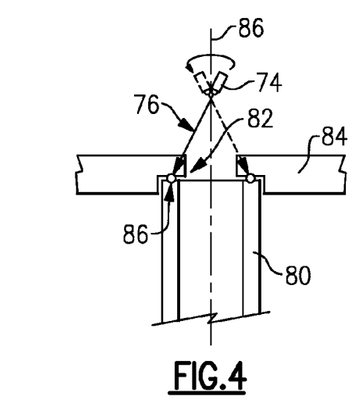
FIG. 4 is a schematic view of another example laser welding method.

Referring to FIG. 4, another example tube 80 corresponds to a shouldered opening 82 disposed within an end plate 84. The tube 80 is disposed concentrically about an axis 86. In this example, the end plate 84 is fabricated from laser transparent material and the tube 80 is fabricated from laser absorbent material. The laser device 74 is disposed on the axis 86 and rotates on the axis 86 to selectively direct laser energy into the desired joint. The position and movement of the laser device 74 provides a conically shaped pattern for the laser energy to travel into the joint between the tube 80 and the end plate 84. The conically orientation and path of the laser energy 76 provides for fixing the laser device 74 in one point, and rotating the laser device about that point on the axis 86. This orientation and movement of the laser device 74 provides the desired joint while reducing the distance that the laser device 74 must travel during a welding process.

Further, the angled orientation of the laser device 74 relative to the axis 86 and the surface of the end plate 84 provide for directing and creating the joint between the tube and end plate as is desired.

As appreciated, an intercooler assembly can include hundreds of tubes that all require attachment and sealing to an endplate or some other end structure through which air is directed into the tubes. Therefore, processes for joining the plastic tubes to the end structures, endplates that reduce cycle time and cost are beneficial.

Figure 5:
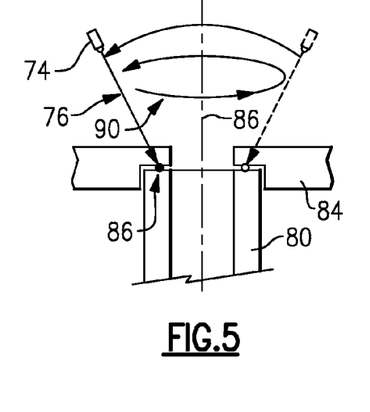
FIG. 5 is a schematic view of another example laser welding method.

Referring to FIG. 5, another example welding scheme is illustrated where the laser device is rotated within an inverted conical path 90. In the inverted conical path 90, the laser device is rotated about the axis 86 at a radial distance from the axis 86. The radial distance and angle of the laser device relative to the axis are selected to provide the joint weld 86 in the desired location. The orientation of the laser device 74 to direct laser energy as is shown in this example provides for the positioning of the weld in a desired orientation that does not require the laser device 74 to be disposed along the axis 86.

Figure 6:
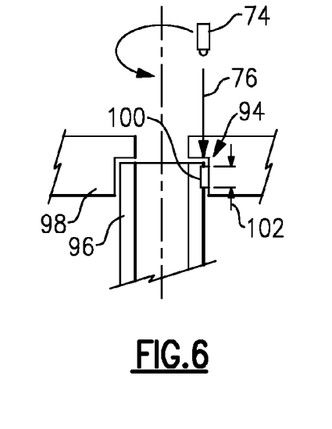
FIG. 6 is a schematic view of another example laser welding method.

Referring to FIG. 6, another example joint configuration and method of forming the joint is illustrated including the laser device directed at a seam 94 between a tube 96 and an end plate 98. In this example both the end plate 98 and the tube 96 are fabricated from a laser semi-transparent material that both absorb laser energy to a desired level. The laser device 74 directs laser energy 76 into the seam to cause a melting of both the tube material and the end plate material in a localized area. However, unlike conventional laser welded plastic joints, the weld bead includes a depth in the direction in which laser energy is directed. This depth is provided by the selection and mating of two semi-transparent materials that effectively absorb common amounts of laser energy to produce the desired depth of the weld bead 100. The laser energy 76 is thereby directed to the seam 94 between the tube 96 and the end plate 98.

As appreciated, the tube is shown attached to an endplate in the illustrated examples. The tubes may also be attached to other end assemblies that provide for directing air for cooling through the intercooler.

Figure 7:
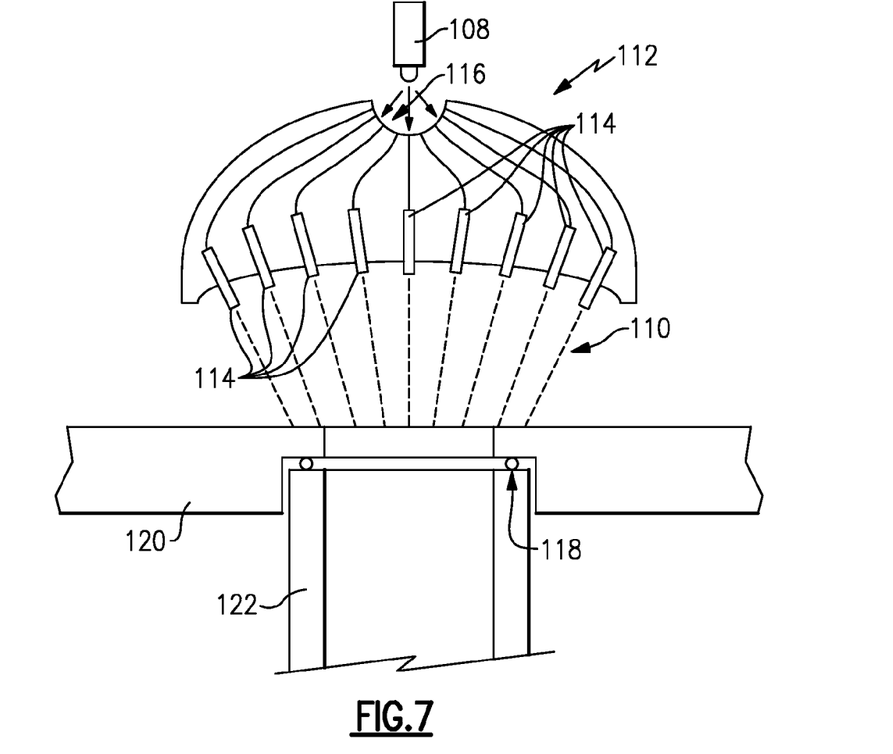
FIG. 7 is a schematic view of another example laser welding method and device.

Referring to FIG. 7, an example laser device 108 emits laser energy into a fiber optic device 112. The fiber optic device 112 includes a plurality of laser directing ends 114 that receive laser energy from a distributing device 116. The laser energy from the laser device 108 is transmitted to each of the laser directing ends 114 and into the joint between the tube 122 and the end plate 120.

In this example, the end plate 120 is fabricated from a laser transparent material and the tube 122 is fabricated from a laser absorbent material. Laser energy from each of the laser directing ends 114 generates a single weld bead. The fiber optic device 112 includes a sufficient number of laser directing ends 114 to completely encircle the desired joint. In the example case, the tube 122 is circular, and thereby the weld seam is configured circumferentially about the interface between the tube 122 and the end plate 120.

Figure 8:
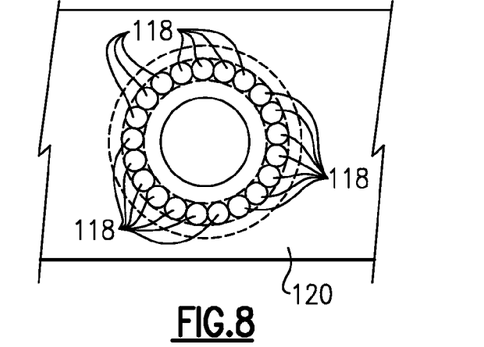
FIG. 8 is a top schematic view of a weld provided by the device and method illustrated in FIG. 7.

Referring to FIG. 8, each of the laser directing ends 114 produces a substantially circular weld bead 118 between the tube 122 and the end plate 120. The weld beads 118 are overlapped to provide a substantially continuous weld about the circumference of the tube 122 and end plate 120 interface. The entire continuous welded joint between the tube 122 and the end plate 120 can be produced without moving the laser device 108.

Figure 9:
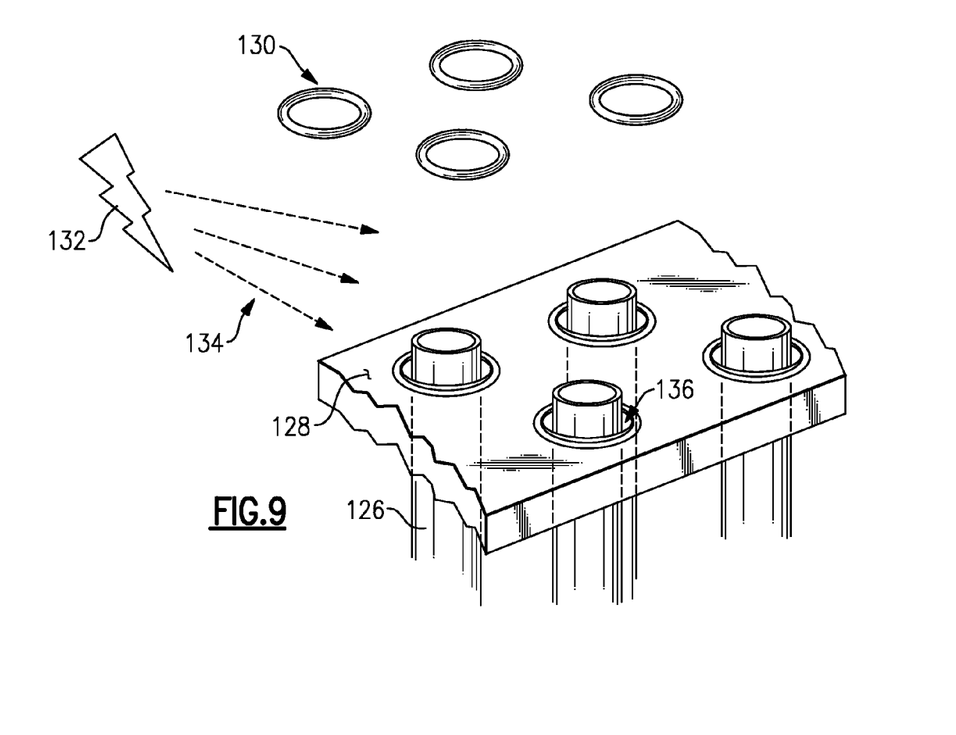
FIG. 9 is a schematic view of a method of attaching plastic tubes to an end portion of an intercooler.

Referring to FIG. 9, another example joint between a plastic tube 126 and an end plate 128 is illustrated and includes metal loaded plastic washers 130. The metal loaded plastic washers 130 are inserted into an opening 136 within the end plate 128 along with the plastic tube 126. An induction heating device, schematically shown at 132, induces energy into the metal loaded plastic washers 130, but not the plastic tubes, or end plates 128. Instead, the induction heating device 132 causes the washers 130 to produce heat that in turn melts parts of the end plate 128 and the tube 126 proximate that washer 130. The washers 130 are then allowed to cool to produce the desired weld joint between the plastic tubes 126 and the end plate 128.

The washer 130 is fabricated from a plastic material that melts responsive to the energy 134 input from the induction heating device 132. The plastic material can be flexible, such as for example a thermoplastic vulcanizate material that is flexible to provide a sealing function. The induction heating device 132 is as known to produce heat in metal parts caused by the inductive energy 134 transmitted into the washers 130.

In process, an entire intercooler assembly with a plurality of tubes 126 is assembled with the corresponding washers 130. The fit of the tubes 126 in the openings 136 along with the washers 130 maintain the desired relative position of the tubes 126 to the end plate 128. The entire device is then exposed to the inductive energy 134. The inductive energy 134 does not substantially affect the plastic material, but does cause the desired localized melting to form the desired weld joints between the tubes 126 and the end plate 128.

Figure 10:
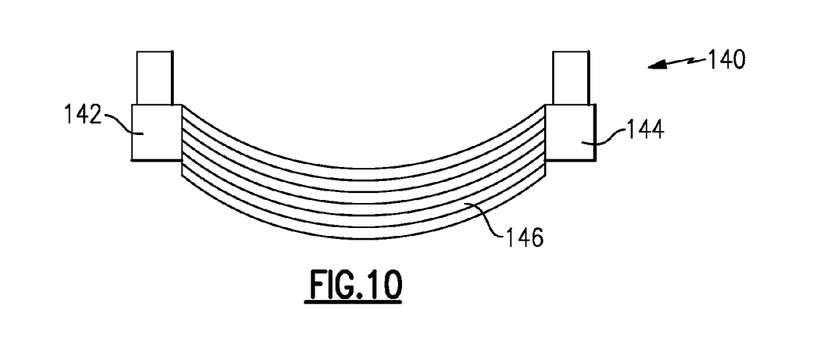
FIG. 10 is a schematic view of an example intercooler assembly.

Referring to FIG. 10, an example intercooler 140 includes a first end manifold 142, a second end manifold 144 and a plurality of plastic tubes 146 extending there between. Conventional intercooler assemblies include a plurality of straight tubes. However, in some instances, space for the intercooler is limited. The example intercooler 140 includes the plurality of plastic tubes 146 that include a curved shape. The curved shape extends outward from a plane defined by the end manifolds to create additional space between the end manifolds 142, 144. Further the curved plurality of plastic tubes 146 increase the length of the plastic tubes as compared to straight plastic tubes to provide additional surface area through which heat can be transferred from fluid with the plastic tubes to cooling airflow outside of the intercooler assembly 140.

Figure 11:
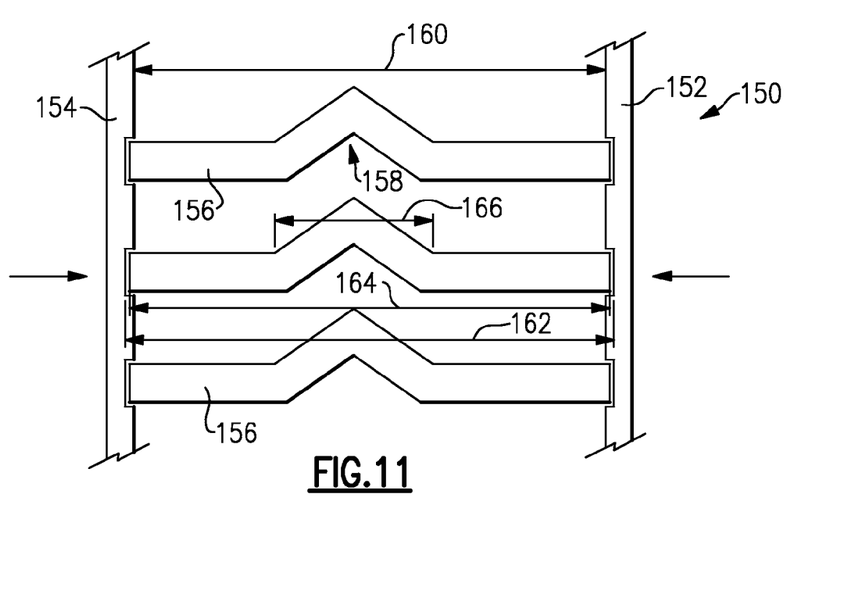
FIG. 11 is a schematic view of another example intercooler assembly.

Referring to FIG. 11, an example intercooler 150 includes a first end 152, a second end 154 and a plurality of tubes 156 that extend there between. Assembly of the intercooler assembly 150 requires that the tubes 156 be of substantially the same length in order to provide the desired fit between the first and second ends 154. The first and second ends 152, 154 are spaced a distance 160 apart. This distance should correspond with the lengths 162, and 164 of the plastic tubes 156. However, manufacturing tolerance can result in different lengths for at least some of the plurality of plastic tubes 156. The different lengths can result in undesirable gaps, or misassembly.

The bends 158 provided in each of the plurality of tubes 156 accommodate for these differences in length by compressing to eliminate undesired gaps and fits. The bend 158 includes a length 166. The length 166 of the bend is variable and adjustable. During assembly, pressure is exerted on each end 152, 154 to the length 160. The pressure provides for the compression of some of the tubes 158 as facilitated by the bends 158. The compressions provide for a desired fit without tightly held tolerances that increase material and assembly costs.

Figure 12:
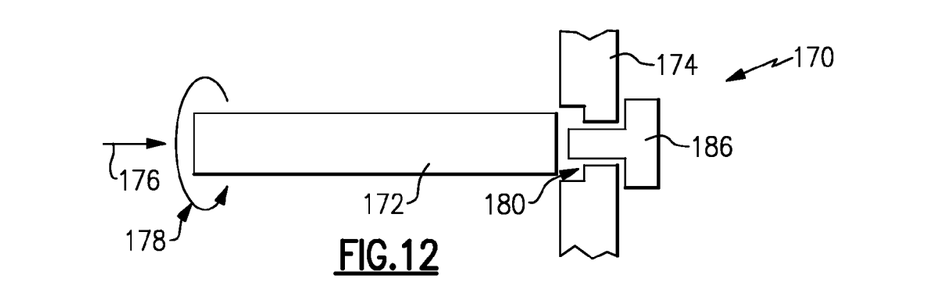
FIG. 12 is a schematic view of an example method of attaching plastic tubes for an intercooler to an end plate.
Figure 13:
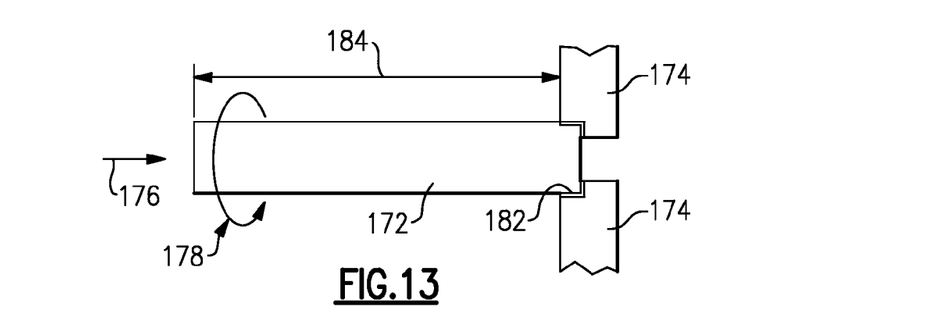
FIG. 13 is another schematic view of the example method illustrated in FIG. 12.

Referring to FIGS. 12 and 13, an example tube attachment method includes rotating a tube 172 at a high speed as indicated by arrows 178 and with a defined pressure 176 abutting the tube against the end plate 174. The resulting friction between the tube 172 and the end plate 174 generates heat that melts the material in a localized area such that the melted plastic from the tube 172 intermingles with the end plate 174 to form the desired joint once cooled. The end plate 174 includes an interface 180 that contacts an end of the tube 172. The interface 180 provides the contact surface onto which the tube 172 is pressed and rotated against. A mandrel 186 provides alignment of the tube 172 relative to the opening within the end plate 174 and provides a heat sink for absorbing and directing excess heat away from the desired weld area to prevent distortion in the plastic components.

Referring to FIG. 13, the tube 172 is pressed against the end plate 174 the in turn results in melting of plastic and the formation of a weld bead 182. The weld bead 182 can be configured with attention to the speed of rotation and the pressure in which the tube 172 is pressed against the end plate 174. The length of the tube 172 can thereby by adjusted as desired by continuing rotation and pressure until material from the plastic tube has melted down to meet the length 184 desired.

As was discussed above, an intercooler can include hundreds of tubes that all require attachment and sealing to an end plate or manifold. The use of the friction welding method described in references to FIGS. 12 and 13 provides for the adjustment of tube length, and for the reduction in the number of joints.

Figure 14:
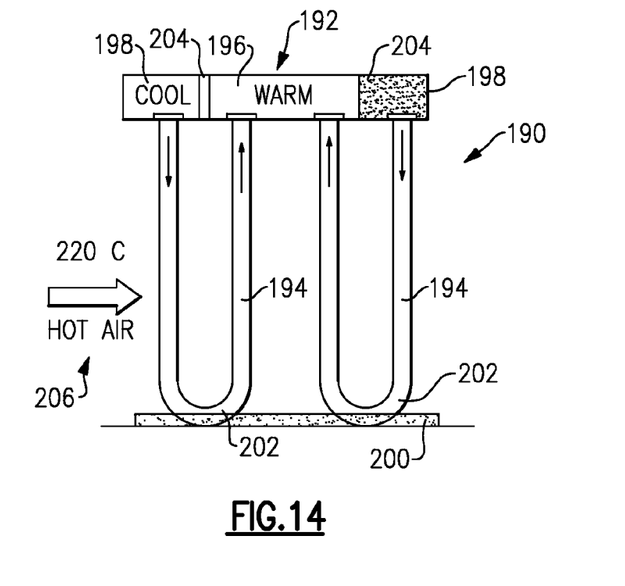
FIG. 14 is a schematic view of another example intercooler assembly.

Referring to FIG. 14, another example intercooler 190 includes a manifold 198 from which tubes 194 extend. The tubes 194 are generally U-shaped and are attached to the manifold 198 at both ends. The manifold 198 includes dividers 204 that separate a warm portion 196 from cool portions 198. The tubes 194 include the bend 200 that provides the desired shape to return cooled or warmed air to the manifold 192.

The U-shaped tubes 194 eliminate a significant amount of joints to simplify assembly and fabrication of the intercooler assembly. As appreciated, each tube 194 eliminates at least two joints that would otherwise be required for conventionally configured intercooler assemblies.

In the example intercooler assembly 190, cool air or fluid is directed through the tube 194 that is exposed to a hot air stream 206. The hot air stream 206 rejects heat into the cool air within the tube 194. The now warm air returns to the manifold 192 to the warm portion 196 separated from the cool portions 198. A bracket 200 is provided to stabilize the distal ends of the tubes 194.

Figure 15:
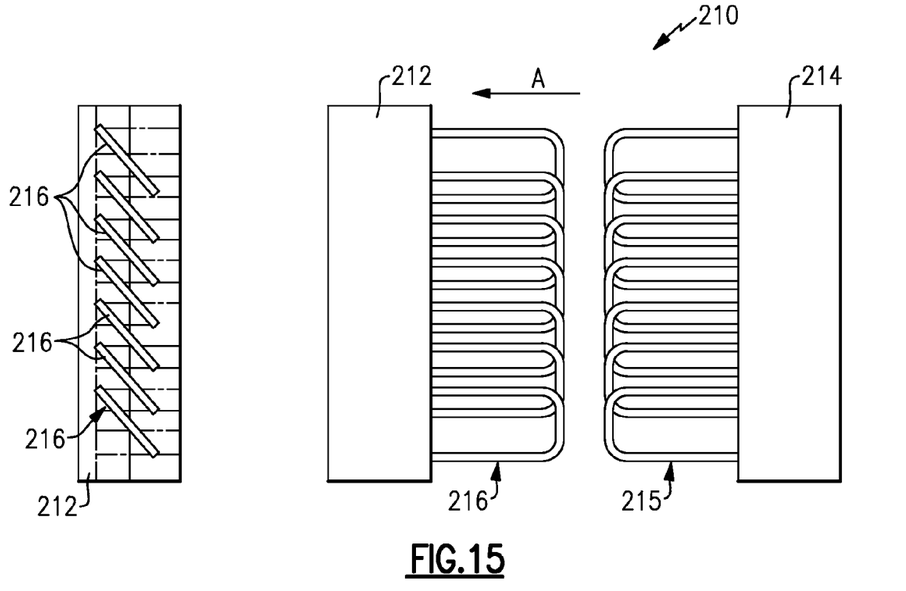
FIG. 15 is a schematic view of another example plastic intercooler assembly.

Referring to FIG. 15, another intercooler assembly 210 includes a plurality of U-shaped tubes 216 that are attached to a first manifold 212, and another plurality of tubes 215 that are attached to a second manifold 214. The two manifolds 212, 214 are combined and spaced from each other such that the tubes 216, and 215 interfit with one another. In this configuration, the tubes are separated between the first and second manifolds 212, 214 to provide the desired thermal exchange capacity. The U-shaped tubes 216 are slanted relative to normal to provide for the interfiting of the plurality of U-shaped tubes 215. Further, the example manifold 212 is split into an inlet portion and an outlet portion for attachment of the ends of the plurality of U-shaped tubes 216.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A plastic intercooler assembly comprising:
    a first end plate;
    a second end plate; and
    a plurality of plastic tubes that extend between the first plate and the second plate that are laser welded to each of the first end plate and the second end plate, wherein the plurality of plastic tubes comprise a first group fabricated from a first plastic material and a second group fabricated from a second plastic material that is different than the first plastic material.

2. The assembly as recited in claim 1, wherein the second plastic material includes a resistance to degradation caused by heat greater than the first plastic material.

3. The assembly as recited in claim 1, wherein a cooling airflow flows through the plurality of plastic tubes wherein the first group of plastic tubes is disposed upstream of the second group of plastic tubes.

* * * * *